United States Patent

Schole et al.

[15] 3,699,221

[45] Oct. 17, 1972

[54] DENTAL PREPARATIONS

[72] Inventors: Murray L. Schole, 487 Munroe Avenue, North Tarrytown, N.Y. 10591; Richard S. Gubner, Middle Neck Road, Sands Point, Port Washington, N.Y. 11050

[22] Filed: Feb. 23, 1965

[21] Appl. No.: 434,678

Related U.S. Application Data

[63] Continuation-in-part of Ser. No. 778,329, Dec. 5, 1958, abandoned.

[52] U.S. Cl. .....................424/54, 424/49, 424/55, 424/56, 424/57
[51] Int. Cl. ..........................................A61k 7/16
[58] Field of Search .........167/93; 424/54, 55, 56, 57

[56] References Cited

UNITED STATES PATENTS

| | | | |
|---|---|---|---|
| 2,135,111 | 11/1938 | Prebluda | 424/55 |
| 2,975,102 | 3/1961 | Matsumura et al. | 424/49 |
| 3,044,939 | 7/1962 | Scanlan et al. | 424/55 |
| 3,105,798 | 10/1963 | Holliday et al. | 424/52 |

OTHER PUBLICATIONS

Martell, Chemistry of the Metal Chelate Compounds, published by Prentice Hall, Englewood Cliffs, N.J., 1956, pages 514, 516, 517, 527, 529, 532, 533, 535, 537, 540– 544, and 546

Martell, Chemistry of the Metal Chelate Compounds, published by Prentice Hall, Englewood Cliffs, N.J., 1956, page 518

Pawlowska, Czaspismo Stomatologiczne, Vol. 9, No. 7, pages 353– 361, 1956

Sequestrene, published by Geigy Industrial Chemicals, Ardsley, New York, 1952, page 21

*Primary Examiner*—Richard L. Huff
*Attorney*—McLean, Boustead & Sayre, John Boustead and N. D. Sayre

EXEMPLARY CLAIM

A water-containing toothpaste comprising a substantially stable solution of a non-toxic, water-soluble ionic strontium compound selected from the class consisting of strontium salts of organic chelating agents and strontium salts of inorganic sequestering agents, said strontium compound having a stability constant lower than that of its corresponding calcium salt, and a surface-active wetting agent compatible with strontium ions in an aqueous solution, the strontium cation of the strontium compound constituting between about 3.6% and about 20.5% by weight of said toothpaste, and said toothpaste being characterized by the substantial absence of substances which precipitate said strontium.

14 Claims, No Drawings

DENTAL PREPARATIONS

This application is a division of our copending application Ser. No. 778,329 filed Dec. 5, 1958, now abandoned.

This invention is that of a dentifrice that is variously effective by topical application in dental therapeutics, for example, as in alleviating hyper-sensitive dentin. The dentifrice of the invention contains as essential therefor a pharmacologically innocuous composition that provides strontium ions during its use in the oral cavity to effect incorporation of strontium as an element in the tooth substance. The invention embraces also the method of alleviating hyper-sensitive dentin, or desensitizing dentin, by applying such a dentifrice to exposed sensitive areas of the teeth that manifest hyper-sensitive dentin.

More particularly, the products of this invention embrace any of the various types of dentifrice dosage forms and comprise as the essential constituent (i) a pharmacologically innocuous water-soluble strontium chelate (i.e. strontium salt of a chelating or sequestering agent), or (ii) a water-soluble organic or inorganic chelating or sequestering agent that can sequester strontium in an aqueous medium, together with a pharmacologically innocuous water-soluble strontium salt that can react in an aqueous medium with such pharmacologically innocuous chelating or sequestering agent to give the corresponding strontium chelate. The chelating agent in each case should be one that forms a strontium chelate of lower stability constant than that of its respective calcium chelate.

These dentifrice products should not include any calcium or other metal, salt or compound, from which any such metal would be sequestered by, and form the corresponding calcium or other metal chelate with, the sequestering agent or the chelate residue of the strontium chelate in the product.

In other words, the dentifrice products of the invention should not include any of the water-insoluble calcium, magnesium, or aluminum compounds ordinarily incorporated as adjuvant bulk excipients generally used in dentifrices, for example as the abrasive ingredient, such as calcium carbonate, calcium pyrophosphate, magnesium oxide, aluminum oxide or hydroxide, and the like. So also tin compounds, e.g. stannous fluoride and stannous chloro-fluoride, likewise should be excluded.

In place of the foregoing water-insoluble bulk excipients for abrasive and other purposes, water-insoluble barium and strontium salts, for example, barium sulphate, barium carbonate, strontium carbonate, and strontium phosphate can be used.

The term "dentifrice" is used herein and in the appended claims generically to embrace not only what is designated as the solid type exemplified by tooth powders and tooth pastes, but also as well the liquid form of dentifrices used for tooth brushing. The so-called slow-releasing or confectionery type of preparations, such as lozenges or troches, and chewing gums, and the like also are included within, to be embraced by, the solid type of denti-frice. Obviously, the lozenge, troche and chewing gum are referred to as slow-releasing dentifrices because their strontium and chelate content is released slowly, for example, from the lozenge only as each newly exposed surface of it is dissolved in the saliva, and from the chewing gum as the latter is kneaded between the teeth, to permit the teeth to be bathed in a solution of the strontium chelate in the saliva.

The expression "chelate residue" includes not only the portion other than the strontium in a strontium chelate used, but also the corresponding portion of a chelating or sequestering agent, which portion would combine, in an aqueous medium, with the strontium of a strontium salt used as described hereinabove to form the corresponding strontium chelate.

Dental clinical investigators have wrestled long with such problems as alleviating or overcoming hyper-sensitive dentin and preventing caries, and with others of the quite common dental ailments. While various treatments have been tried for hyper-sensitive dentin and also for others of the ailments, and others were considered and studied, each approach still shows its own various peculiar shortcomings so that the problems involved have not yet been solved sufficiently satisfactorily.

It has been found that the dentifrice preparations embraced by the invention are beneficial and, merely by topical application, readily contribute effective improvement particularly in treatment of hyper-sensitive dentin, and provide conditions conducive to the promotion of good dental hygiene and the possibility of prophylaxis in relation to various dental disorders. To illustrate, in many cases the keen sensitiveness to hot and to cold and the resulting, frequently intense, pain characteristic of hyper-sensitive dentin, was observed to disappear even after only a very short use of, or treatment with, a dentifrice of the invention, of both the solid as well as of the liquid type.

Included among the dentifrices of the invention are water-containing toothpastes comprising a substantially stable solution of a non-toxic, water-soluble ionic strontium compound and a surface-active wetting agent compatible with strontium ions in an aqueous solution; and said water-containing toothpastes are characterized by the substantial absence of substances which precipitate said strontium.

The water-soluble ionic strontium compound of these toothpastes can be selected from strontium chloride, strontium acetate, strontium bromide, strontium nitrate, strontium citrate, strontium gentisate, strontium gluconate, and strontium salicylate.

In these toothpastes, the water-soluble strontium ions can constitute a sufficient amount by weight of the toothpaste, for example, between about 3.6 and about 7.2 percent, for it to alleviate hypersensitive dentin upon being applied to a sensitive area of a tooth having hypersensitive dentin and in an amount to alleviate said conditions.

Then too, the wetting agent in these toothpastes can constitute a sufficient amount of at least 0.5 percent by weight thereof, for example, 0.5 percent to about 10 percent, for its effective application to the teeth by ordinary brushing in the customary manner of brushing teeth.

Those toothpastes comprising said water-soluble ionic strontium compound also can include a bodying agent compatible with the strontium ions, and also, to the extent of between 10 percent and 50 percent of the weight of the toothpaste, a polishing agent compatible with strontium ions in an aqueous solution and inert to reaction with the other constituents of the toothpaste.

Moreover, a distinctive feature of the invention is that by mere topical application of one of its strontium chelate, or strontium salt and chelating agent, containing dentifrices there occurs at least in part the effecting of an exchange mineralization between the calcium of the insoluble hydroxyapatite of the tooth and the strontium of the strontium chelate, or strontium salt and chelating agent, of the new dentifrice, and with beneficial therapeutic results.

The chelating agent or residue in the dentifrice serves to enhance the indicated exchange mineralization. When the teeth are contacted by the strontium chelate of the dentifrice in the mouth fluids, calcium ions are removed from the hydroxyapatite of the teeth and are preferentially sequestered displacing strontium and yielding the calcium chelate instead while at the same time the thus released strontium ions in turn replace in the tooth hydroxyapatite the calcium ions that were removed.

The resulting strontium hydroxyapatite is less soluble than the original (i.e. calcium) hydroxyapatite, the natural principal constituent of the teeth. Such strontium hydroxyapatite is more resistant to the solubilizing effect of general or local lowered pH in the mouth, which latter condition is one generally recognized to be a factor in the dissolution of the tooth surface enamel, for example, as in dental caries.

Strontium hydroxyapatite is more resistant not only to dissolution by the acidic substances occurring in the oral cavity, such as lactic and citric acids and amino acids, but also to the chelating effect of these organic acids as well as to that of others of the various organic substances that have chelating effects such as food residues and those formed by bacterial action. Such chelating action also is considered to play a part in the loss of calcium from enamel with dissolution of tooth substance.

The following examples of several different types of dentifrices illustrate the invention, although its scope as to type and composition is not restricted to them:

EXAMPLE 1

Tooth Paste

| | | |
|---|---|---|
| strontium citrate | 65 | grams |
| alcohol | 0.9 | c.c. |
| glycerine | 30 | c.c. |
| gum tragacanth | 1 | gram |
| essential oils (for flavoring) | 1 | gram |
| water quantity sufficient to make | 100 | grams. |

EXAMPLE 2

Tooth Paste

| | | |
|---|---|---|
| disodium salt of ethylenediamine tetraacetic acid | 20 | grams |
| strontium chloride (6 H$_2$O) | 20 | grams |
| strontium carbonate | 25 | grams |
| tetra-oxyethylene sorbitan mono-cleate | 0.5 | gram |
| algin | 1 | gram |
| essential oils (for flavoring) | 1 | gram |
| propylene glycol | 25 | grams |
| alcohol | 0.9 | gram |
| water quantity sufficient to make | 100 | grams. |

EXAMPLE 3

Tooth Paste

| | | |
|---|---|---|
| disodium strontium ethylenediamine tetraacetate | 30 | grams |
| barium sulfate | 30 | grams |
| tetra-oxyethylene sorbitan mono-cleate | 0.5 | gram |
| algin | 1 | gram |
| essential oils (for flavoring) | 1 | gram |
| propylene glycol | 20 | grams |
| alcohol | 0.9 | gram |
| water quantity sufficient to make | 100 | grams. |

EXAMPLE 4

Tooth Paste

| | | |
|---|---|---|
| strontium carbonate | 50 | grams |
| strontium gluconate | 20 | grams |
| propylene glycol | 10 | GRAMS |
| GLYCERINE | 10 | grams |
| tragacanth | 2 | grams |
| essential oils (for flavoring) | 1 | gram |
| saccharin | 0.5 | gram |
| water quantity sufficient to make | 100 | grams. |

The customary methods are applicable to preparing the foregoing tooth pastes. For example, the finely divided solid ingredients can be mixed dry and then incorporated in the mixed liquid ingredients (as the propylene glycol, glycerine, and alcohol). Then the essential oils for flavoring can be worked in.

EXAMPLE 5

Liquid Dentifrice

| | | |
|---|---|---|
| tetra-oxyethylene sorbitan mono-oleate | 0.5 | gram |
| alcohol | 20 | grams |
| glycerine | 45 | grams |
| oil of cloves | 0.3 | gram |
| oil of spearmint | 0.3 | gram |
| oil of cassia | 0.3 | gram |
| saccharin | 0.5 | gram |
| strontium gentisate | 20 | grams |
| tincture cudbear | 0.6 | gram |
| water quantity sufficient to make | 100 | c.c. |

The alcohol and the glycerine are added to one another and stirred together, and, the tetra-oxyethylene sorbitan mono-oleate then is dissolved in the alcohol and glycerine solution. The saccharin then is stirred in and also the tincture cudbear for coloring. Then the strontium gentisate is stirred in and followed by the flavoring ingredients, namely, the oils of cloves, spearmint, and cassia; and finally the water is added, and the whole is stirred to uniformity.

EXAMPLE 6

Tooth Powder

| | | |
|---|---|---|
| strontium chloride (6 H$_2$O) | 30 | grams |
| sodium hexametaphosphate | 34.9 | grams |
| strontium carbonate | 25 | grams |
| gum tragacanth | 9 | grams |
| saccharin | 0.1 | gram |
| essential oils (eucalyptol, methyl salicylate, oil of peppermint) for flavoring | 1 | grams. |

EXAMPLE 7

Tooth Powder

| | | |
|---|---|---|
| strontium salicylate | 30 | grams |
| gum tragacanth | 10 | milligrams |
| karaya gum | 1 | gram |
| saccharin | 0.5 | gram |
| essential oils (for flavoring) | 1 | gram |
| strontium carbonate quantity sufficient to make | 100 | grams. |

There is nothing special, or different from the ordinary, in preparing these tooth powders. The various solid ingredients are in the usual finely divided form with a particle size within the range ordinarily considered suitable for particles of ingredients for tooth powders. Those finely divided ingredients are merely included in the make-up batch and mixed in along with the other ingredients to yield a powder mix of uniform composition.

EXAMPLE 8

Lozenges or Troches

Mix 100 grams of powdered strontium citrate, 200 grams of extract of glycyrrhiza, 20 grams of powdered tragacanth, and 400 grams of powdered sucrose, and work up into a troche-making mass with a suitable amount of syrup of tolu, and then divide into 1,000 troches.

EXAMPLE 9

Chewing Gum

| | |
|---|---|
| strontium citrate | 18 grams |
| chicle | 81 grams |
| saccharin | 1 grams |
| essential oils (sufficient for flavoring) | |

The several other ingredients are worked into the chicle in known manner and turned out in the form of the common chewing gum slabs. Alternatively, the homogenous mass is put up in the form of individual sugar-coated bits similar to the well-known Feenamint' phenolphthalein gum bits or the aspirin gum bits, and in this latter form some part of the strontium citrate can be included in the coating.

The foregoing, specifically exemplified, various types of dentifrices need not be confined to their respective particular compositions recited in the illustrative examples. Alternatively, their respective individual ingredients, for example, other than the strontium chelate or strontium salt and chelating agent, can be varied individually in amounts used or can be omitted entirely or replaced by others ordinarily used for relatively similar purposes, so long as they are compatible with the strontium chelate or chelating agent present and contain no metallic cations that are chelated preferentially to strontium, and likewise are compatible with the other ingredients, as desired, within the skill of those occupied in this art.

Perhaps only a single illustration of such substitution is necessary, for example, the tetra-oxyethylene sorbitan mono-oleate of Example 2 can be replaced in whole or in part by an equivalent amount of any other compatible poly-oxyethylene hexitol inner ether mono-ester of a monobasic fatty acid having from 10 to 16 or 18 carbon atoms in its chain, for example, as described in U. S. Pat. No. 2,417,299 and in U. S. Pat. No. 2,518,230 (inventors Freedman and Green), or any as described in Paul W. Wilcox and Bernard Jatul U. S. Pat. No. 2,472,640.

The inorganic chelating agent of Example 6 can be replaced by an equivalent quantity of any other inorganic sequestering agent, such as any other alkali metal or ammonium or alkanolamine hexametaphosphate or a mixture of any of them.

Then also, instead of using both a strontium salt which has no chelate residue, such as the strontium chloride of Example 6 along with its hexametaphosphate, both can be replaced by an equivalent mixture of such a strontium salt (which has no chelate residue) together with the equivalent quantity of an alkali metal or ammonium or alkanolamine hexametaphosphate.

Similarly, any of the indicated inorganic sequestering agents or strontium salts of them, or organic chelating agent or strontium chelates as in Examples 2 and 3 respectively, can be replaced by an equivalent quantity of water-soluble strontium chelate, or preferably a water-soluble salt, of some other organic chelating agent. Such other organic chelating agent, for example, can be some other polyalkylene polyamine having the general formula

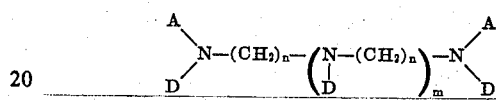

wherein $n$ is 2 to 6 inclusive, $m$ is 0 to 2 inclusive, D is $-CH_2COOH$, $-CH_2CH_2COOH$ or the alkali metal salts thereof (sodium, potassium, and $-NH_4$), and A is the same as D, or lower alkyl or hydroxy lower alkyl, with at most five carbon atoms. Examples of carboxylic poly- or diamino acids specifically included within the above formula are ethylene diamine N,N' tetraacetic acid, propylene 1,2-diamine N,N' tetraacetic acid, 1,3-diaminopropanol-2-N,N' tetraacetic acid, diethylenetriamine N,N' tetraacetic acid, diethylenetriamine N,N',N'' pentaacetic acid, hexamethylenediamine N,N' tetraacetic acid, beta-hydroxyethylethylenediamine-N,N' triacetic acid, hydroxyethyl ethylenediamine triacetic acid, N,N-dihydroxyethyl ethylenediamine diacetic acid, N,N'-dihydroxyethyl ethylenediamine diacetic acid and polyalkylene polyamines as seen in U. S. Pat. Nos. 2,831,885 and 2,848,469.

Further exemplifying the organic chelating agents which can be used, including their alkali salts (alkali metal and ammonium and alkanolamine, for example) and strontium chelates, are other aliphatic and aromatic carboxylic acids which form strontium chelates with lower stability constants than those of their respective calcium chelates. Among them are other N-substituted carboxylic acids which include the nitrilo acetic acids, e.g. nitrilo triacetic acid (i.e. triglycin), their alkali metal salts as the "Trilons" such as $N(CH_2COONa)_3$; and other amino substances, for example, amino acids such as glycine, glycylglycine, glucosylglycine, penicillamine, aspartic and glutamic acids; hydroxy-carboxylic acids (whether mono- or polyhydric or mono- or polycarboxylic) such as the aliphatic hydroxy-carboxylic acids as citric acid, and gluconic acid; and aromatic carboxylic acids such as the mono- and polynuclear hydroxy, carboxylic acids such as salicylic, gentisic, gamma-resorcylic (i.e. 2,6-dihydroxybenzoic), trihydroxybenzoic, and aurintricarboxylic acids; and corresponding thio-analogs such as thioethanolamine, thiopyracatechol, and thio-acids e.g. thio-malic and thioglycollic acids.

The different alkali salts, such as the alkali metal salts, of the various foregoing acids can be prepared from them respectively in the same way as used to make the alkali salts (ammonium and alkali metal) in Examples 3 and 4 of U. S. Pat. No. 2,859,104, or by replacing the barium hydroxide, in the method of its Examples 5 and 2, by strontium hydroxide.

In that way, for example, the strontium gluconate of Example 4 and the strontium gentisate of Example 5, can be made from their respective alkali metal salts; and the disodium strontium ethylene-diamine tetraacetate can be prepared from the corresponding disodium ethylenediamine diacetate diacetic acid.

The strontium chloride of Examples 2 and 6 can be replaced by some other strontium salt that is non-toxic and non-discoloring-to-the-teeth in the dosage and regimen used, for example, by another water-soluble strontium salt of an inorganic acid, such as another halide as its bromide, or its nitrate, or of an organic acid, as its formate, acetate, citrate, gentisate, gluconate, or salicylate.

Such strontium salt used in any of the examples need not be used alone for more than one of them may be used. In any case, it is advisable that the quantity of such strontium salt or salts used be sufficient to form, when in use, the strontium chelate with the total amount of free chelating agent present in the dentifrice. The strontium ions constitute between about 3.6 and about 20.5 percent by weight of the toothpaste.

Likewise, the respective free chelating agent of Examples 2 and 6 need not be used alone for more than one can be used. Similarly, more than one strontium chelate can be used in any other example.

The expression "pharmacologically innocuous" used herein is the recognized equivalent for the expression "therapeutically acceptable" often used to designate a substance which is physiologically and pharmacologically innocuous when taken in a dosage and in a regimen (i.e. frequency of administration) that is effective for its indicated therapeutically useful application, and thus is pharmacologically harmless.

The method of the invention involves alleviating hyper-sensitive dentin, by a procedure which comprises administering to the oral cavity a dentifrice of the type and constitution herein broadly described and in any available dosage form, allowing the constituents of such dentifrice, that are effective for alleviating hyper-sensitive dentin, i.e. the strontium and chelate content, while in the aqueous medium in the mouth to contact at least the exposed sensitive areas of any of the teeth that manifest hyper-sensitive dentin, for a time sufficient for relief from such sensitivity to appear, and repeating such application of such strontium and chelate content when necessary and at intervals as necessity for such repetition occurs.

Thus, broadly the method of the invention comprises applying to such exposed sensitive areas of teeth that manifest such hyper-sensitive dentin, a dentifrice composition that provides cationic strontium under aqueous conditions during its use in the oral cavity and, associated with such cationic-strontium-providing content in the composition, a sequestering agent or a chelate residue of a strontium chelate.

While the invention has been explained by detailed description of certain specific embodiments of it, it is understood that various modifications and substitutions can be made in any of these embodiments or others, such as replacing the polishing agent of Example 2 by that of Example 3, or vice versa, or replacing either of them by barium carbonate or strontium phosphate, and within the scope of the appended claims which are intended to cover also equivalents of any of the disclosed specific embodiments.

What is claimed is:

1. A water-containing toothpaste comprising a substantially stable solution of a non-toxic, water-soluble ionic strontium compound selected from the class consisting of strontium salts of organic chelating agents and strontium salts of inorganic sequestering agents, said strontium compound having a stability constant lower than that of its corresponding calcium salt, and a surface-active wetting agent compatible with strontium ions in an aqueous solution, the strontium cation of the strontium compound constituting between about 3.6 percent and about 20.5 percent by weight of said toothpaste, and said toothpaste being characterized by the substantial absence of substances which precipitate said strontium.

2. The toothpaste of claim 1 wherein said strontium compound is a strontium salt of an inorganic sequestering agent.

3. The toothpaste of claim 2 wherein said strontium compound is a strontium salt of a condensed phosphate.

4. The toothpaste of claim 1 wherein said strontium compound is a strontium salt of an organic chelating agent.

5. The toothpaste of claim 4 wherein said strontium compound is strontium disodium ethylene diamine tetraacetate.

6. The toothpaste of claim 4 wherein said strontium compound is strontium citrate.

7. The toothpaste of claim 4 wherein said strontium compound is strontium salicylate.

8. The toothpaste of claim 4 wherein said strontium compound is strontium gentisate.

9. The toothpaste of claim 4 wherein said strontium compound is strontium gluconate.

10. The toothpaste of claim 4 wherein said strontium compound is strontium acetate.

11. A water-containing toothpaste comprising a substantially stable solution of non-toxic, water-soluble ionic strontium chelate having a stability constant lower than that of its corresponding calcium chelate and a surface-active wetting agent compatible with strontium ions in an aqueous solution, said toothpaste being characterized by the substantial absence of substance which precipitate said strontium, the strontium cation of the strontium chelate constituting between about 3.6 percent and about 20.5 percent by weight of said toothpaste.

12. A water-containing toothpaste comprising a substantially stable solution of a non-toxic, water-soluble ionic strontium chelate having a stability constant lower than that of its corresponding calcium chelate, a surface-active wetting agent compatible with strontium ions in an aqueous solution, and a polishing agent selected from the class consisting of strontium phosphate, strontium carbonate, barium sulfate and barium carbonate, said tooth paste being characterized by the substantial absence of substances which precipitate said strontium, the strontium cation of the strontium chelate constituting between about 3.6 and 20.5 percent by weight of said toothpaste.

13. A water-containing toothpaste comprising a solution of a non-toxic strontium chelate having a stability constant lower than that of its corresponding calcium chelate providing strontium ions, a surface-active wetting agent, a polishing agent, and characterized by the substantial absence of substances incompatible with the strontium ions in an aqueous solution, the strontium cation of the strontium chelate constituting between about 3.6 and 20.5 by weight of said toothpaste.

14. A dentifrice comprising a substantially stable, water-soluble strontium compound selected from the class consisting of strontium salts of organic chelating agents and strontium salts of inorganic sequestering agents, said strontium compound having a stability constant lower than that of its corresponding calcium salt, a surface-active wetting agent compatible with strontium ions in an aqueous solution, the strontium cation of the strontium compound constituting between about 3.6 and 20.5 percent by weight of said dentifrice, said dentifrice being characterized by the substantial absence of substances which precipitate strontium ions.

* * * * *